United States Patent Office 3,247,215
Patented Apr. 19, 1966

3,247,215
QUATERNARY METHINE DYES FOR ACRYLIC FIBERS
John G. Fisher, David J. Wallace, and James M. Straley, Kingsport, Tenn., assignors to Eastman Kodak Company, Rochester, N.Y., a corporation of New Jersey
No Drawing. Filed Sept. 6, 1963, Ser. No. 306,990
15 Claims. (Cl. 260—294.9)

This invention relates to new methine compounds and particularly to new quaternary compounds especially useful in the art of dyeing or coloring.

This application is a continuation-in-part of our U.S. patent application Serial No. 125,343, filed July 20, 1961, now U.S. Patent No. 3,141,018.

In our parent application are disclosed methine compounds having the formula:

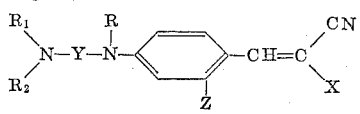

wherein R and $R_1$ each represents an alkyl radical having 1 to 4 carbon atoms, $R_2$ represents an alkyl radical having 1 to 4 carbon atoms or a β-cyanoethyl group, Y represents an alkylene radical having 2 to 4 carbon atoms, X represents a cyano group, a —$COOCH_2CH_2CN$ group or a —$COOR_3$ group, wherein $R_3$ represents an alkyl radical having 1 to 4 carbon atoms, Z represents a hydrogen atom or a methyl radical and wherein

collectively represents a morpholinyl radical or a piperidyl radical, and the quaternary ammonium salts of said methine compounds.

The quaternary compounds of the present invention include tetraalkyl quaternary ammonium compounds and quaternary ammonium compounds in which the quaternary nitrogen atom is a part of a ring system having the general formula.

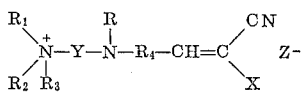

wherein R= an alkyl radical including unsubstituted alkyl, preferably lower alkyl of 1 to 4 carbon atoms such as methyl, ethyl, propyl, isopropyl, butyl, and substituted alkyl, preferably substituted lower alkyl such as alkoxyalkyl e.g. methoxyethyl, ethoxypropyl, aryloxyalkyl e.g. phenoxyethyl, arylalkyl e.g. benzyl, cyanoalkyl e.g. β-cyanoethyl, haloalkyl e.g. β-choroethyl.

$R_1$, $R_2$, and $R_3$ each= a lower alkyl radical including unsubstituted lower alkyl of 1 to 4 carbon atoms and substituted lower alkyl such as benzyl, cyanoethyl etc., or $R_1$, $R_2$ and $R_3$ together with the nitrogen atom (N+) to which they are attached from unsubstituted or substituted pyridinium, quinolinium, morpholinium or piperidinium radicals such as pyridinium, 2-picolinium, 2-benzylpyridinium, 2,4-dimethylpyridinium, 2,6-dimethylpyridinium, 2-methyl-5-ethylpyridinium, 2,4,6-trimethylpyridinium, 4 - benzylpyridinium, 3 - methylpyridinium quinolinium and 3-benzyl-, 2,4-diethoxy-, 6-methoxy-, 3-ethyl-, 3-ethoxy-, 2-ethyl-, 3-methyl-, 4-butoxy, 4-phenoxy- and 3-phenyl-quinolinium radicals; piperidinium and 2-benzyl-, 2-cyclohexyl-, 4,4-dimethyl-3-phenyl-, 3,4-diphenyl-, 4-isopropyl-, 4-methoxy-, 3-methyl-, 4-methyl-, 3-phenyl- and 4-phenyl-piperidinium radicals; morpholinium, 4-benzyl, 2,6-dimethyl-, 4-phenyl-, 4-methyl-, 4-ethoxymethyl-, 4-propylmorpholinium radicals, Y=lower alkylene of 1 to 4 carbon atoms such as methylene, ethylene, propylene, butylene, $R_4$=a p-phenylene radical including unsubstituted p-phenylene and substituted p-phenylene such as lower alkyl-p-phenylene e.g. 2-methyl-, 3-butyl-, 3-methyl-p-phenylene; lower alkoxy-p-phenylene e.g. 2-methoxy- and 3-methoxy-p-phenylene, etc., X=cyano, —$COOCH_2CH_2CN$, lower —COOalkyl, —$CONH_2$ or lower —CON(alkyl)$_2$, Z=an anion or acid radical such as halogen, e.g. I, Cl, p-toluene sulfonate, methosulfate, and other anions derived from well-known quaternizing agents.

A group of the quaternary compounds particularly efficacious as dyes for textile materials have the formula

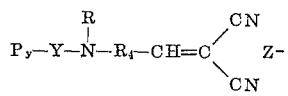

in which Py is a substituted or unsubstituted N-pyridinium radical such as given above, Y is lower alkylene especially ethylene, R is lower alkyl especially ethyl or propyl, $R_4$ is p-phenylene especially 2-methyl-p-phenylene, X is $CONH_2$, CN or $COOCH_3$ and Z is an acid anion derived from a quaternizing agent.

The quaternary methine compounds of our invention are valuable dyestuffs for various synthetic textile materials. The quaternary methine compounds dye polyacrylonitrile and modified polyacrylonitrile textile materials fast, bright yellow shades. The quaternary methine compounds have good affinity for the aforesaid textile materials and yield bright yellow dyeings thereon which have good fastness to light, gas, sublimation and wet processing. Wet processing includes, for example, washing, perspiration, wet ironing and wet sublimation.

Verel modacrylic, Orlon 42 acrylic, Dacron and Kodel polyester textile materials are illustrative of materials that can be dyed with the new methine compounds of our invention. Cellulose esters that can be dyed include, for example, cellulose acetate, cellulose propionate, cellulose butyrate, cellulose acetate-propionate and cellulose acetate-butyrate. In particular, the quaternary methine compounds exhibit substantially better fastness to sublimation than do the corresponding non-quaternary methine compounds of our parent invention. For example, the quaternary compound of Example 3 below has better sublimation fastness than either the corresponding non-quaternized compound of Example 2 or the non-quaternized compound of Example 4.

The tetraalkyl quaternary ammonium methine compounds can be prepared as described in our parent invention by quaternization of the non-quaternary compounds of formula

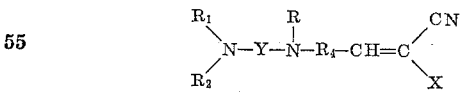

wherein R, $R_1$, $R_2$, $R_4$, X and Y have the meaning given above.

Quaternization may be carried out in an inert solvent using the known quaternizing agents. A dialkyl sulfate, an alkyl chloride, an alkyl bromide, an alkyl iodide, an aralkyl chloride, an aralkyl bromide or an alkyl ester of paratoluene sulfonic acid, for example, can be employed. Specific quaternize agents include, for example, dimethyl sulfate, diethyl sulfate, dipropyl sulfate, dibutyl sulfate, ethyl bromide, ethyl chloride, methyl iodide, ethyl iodide, n-butyl iodide, lauryl iodide, benzyl chloride, benzyl bromide, methyl p-toluene sulfonate, ethyl p-toluene sulfonate, n-propyl p-toluene sulfonate and n-butyl p-toluene sulfonate. Methine compounds useful as textile dyes are obtained regardless of the type of quarternizing agent used. Inert solvents that can be employed in the quaternization reaction include, for example, dimethyl formamide, acetone, ethylene glycol monoethyl ether, isopropanol, n-butanol, chlorobenzene and nitrobenzene.

The non-quaternary methine compounds are prepared as described in our parent application by reacting the adehydes $$\begin{array}{c} R_1 \\ \diagdown \\ R_2 \diagup \end{array} N-Y-\underset{R}{\underset{|}{N}}-R_4-CHO$$

with active methylene compounds having the formula $NCCH_2X$, such as malononitrile.

Alternately, the tetraalkyl quaternary compounds can be made by quaternizing the aldehydes $$\begin{array}{c} R_1 \\ \diagdown \\ R_2 \diagup \end{array} N-Y-\underset{R}{\underset{|}{N}}-R_4-CHO$$

and condensing the product with the active methylene compound $NCCH_2X$.

Similarly, the heterocyclic quaternary ammonium methine compounds can be obtained as described in the examples below by reacting the aldehydes $$Cl-Y-\underset{R}{\underset{|}{N}}-R_4-CHO$$

with pyridine, quinoline, piperidine or morpholine, then reacting with $NCCH_2X$ or the methine dye $$ClY\underset{R}{\underset{|}{N}}R_4CH=\underset{CN}{\underset{|}{C}}-X$$

may be treated with pyridine, quinoline, and their derivatives, etc.

Malononitrile, cyanoacetamide, β-cyanoethyl cyanoacetate, isopropyl cyanoacetate, n-butyl cyanoacetate and tertiarybutyl cyanoacetate are illustrative of the active methylene compounds used in the preparation of the new methine compounds of our invention.

p-(N-methyl-N-dimethylaminoethylamino)benzaldehyde,
p-(N-methyl-N-diethylaminoethylamino)benzaldehyde,
p-(N-ethyl-N-diethylaminoethylamino)benzaldehyde,
p-(N-n-propyl-N-diethylaminoethylamino)benzaldehyde,
p-(N-n-butyl-N-diethylaminoethylamino)benzaldehyde,
p-(N-ethyl-N-di-n-propylaminoethylamino)benzaldhyde,
p-(N-ethyl-N-di-n-butylaminoethylamino)benzaldehyde,
p-(N-ethyl-N-β-morpholinoethylamino)benzaldehyde,
p-(N-ethyl-N-γ-morpholinopropylamino)benzaldehyde,
p-(N-ethyl-N-delta-morpholinobutylamino)benzaldehyde,
p-(N-ethyl-N-β-piperidylethylamino)benzaldehyde,
p-(N-ethyl-N-γ-piperidinopropylamino)benzaldehyde,
p-(N-ethyl-N-delta-piperidinobutylamino)benzaldehyde,
p-(N-ethyl-N-γ-diethylaminopropylamino)benzaldehyde,
p-(N-ethyl-N-delta-diethylaminobutylamino)benzaldehyde,
p-(N-methyl-N-dimethylaminoethylamino)-2-methylbenzaldehyde,
p-(N-methyl-N-diethylaminoethylamino)-2-methylbenzaldehyde,
p-(N-ethyl-N-diethylaminoethylamino)-2-methyl benzaldehyde,
p-(N-n-propyl-N-diethylaminoethylamino)-2-methylbenzaldehyde,
p-(N-n-butyl-N-diethylaminoethylamino)-2-methylbenzaldehyde,
p-(N-ethyl-N-di-n-propylaminoethylamino)-2-methylbenzaldehyde,
p-(N-ethyl-N-di-n-butylaminoethylamino)-2-methylbenzaldehyde,
p-(N-ethyl-N-β-morpholinoethylamino)-2-methylbenzaldehyde,
p-(N-ethyl-N-γ-morpholinopropylamino)-2-methylbenzaldehyde,
p-(N-ethyl-N-delta-morpholinobutylamino)-2-methylbenzaldehyde,
p-(N-ethyl-n-β-piperidinoethylamino)-2-methlybenzaldehyde,
p-(N-ethyl-N-γ-piperidinopropylamino-2-methylbenzaldehyde,
p-(N-ethyl-N-γ-diethylaminopropylamino)-2-methylbenzaldehyde,
p-(N-ethyl-N-delta-diethylaminobutylamino)-2-methylbenzaldehyde, and
p-(N-ethyl-N-delta-piperdinobutylamino)-2-methylbenzaldehyde,
p-(N-β-chloroethyl-N-ethylamino)-o-tolyl aldehyde, and
p-(N-β-chloroethyl-N-butyl)benzaldehyde are representative of the benzaldehyde compounds used for preparation of our new quaternized methine compounds.

The following examples illustrate the compounds of our invention and their manner of preparation.

EXAMPLE 1

*Aldehyde preparation*

To a solution of 26.2 grams of N-n-butyl-N-β-diethylaminoethyl-m-toluidine in 20 cc. of dimethylformamide there were added slowly with stirring at 10–20° C. 11 cc. of $POCl_3$. The reaction mixture resulting was heated on the steam bath for 1.5 hours. After cooling, the reaction mixture was drowned in 20 volumes of water, made slightly basic with NaOH and extracted with 100 cc. of $CHCl_3$. The extract was evaporated to dryness. p-(N-n-butyl - N - β-diethylaminoethylamino)-2-methylbenzaldehyde was recovered as a sticky residue and was used as such.

EXAMPLE 2

A solution of 29 grams of the product of Example 1, 6.6 grams of malononitrile and 1 cc. of piperidine in 100 cc. of alcohol was cooled to 10° C. Yellow crystals of the desired product precipitated and were recovered by filtration, washed with cold methyl alcohol and air-dried. The product obtained has the formula:

$$(C_2H_5)_2N-CH_2CH_2-\underset{\underset{CH_3}{|}}{N}-\underset{}{\underset{}{\bigcirc}}-CH=C\underset{CN}{\overset{CN}{\diagup}}$$
$$\phantom{xxxxxxxxxxxxxx}\underset{C_4H_{9(n)}}{|}$$

and melts at 77–78° C.

EXAMPLE 3

*Quaternization*

Three grams of the product of Example 2, 0.5 cc. of dimethylsulfate and 5 cc. of dry chlorobenzene were stirred together at 40–50° C. After about an hour the reaction mixture was cooled to room temperature, the oil formed solidifying. The reaction product was recovered by filtration, washed with ether and dried in a vacuum desiccator. A quaternary ammonium salt form of the methine compound of Example 2 was obtained. It is water-soluble and dyes Orlon and Verel textile materials fast yellow shades. The dye has the formula $$(C_2H_5)\overset{+}{N}CH_2CH_2-\underset{\underset{CH_3}{|}}{N}-\underset{}{\underset{}{\bigcirc}}-CH=C\underset{CN}{\overset{CN}{\diagup}}\ OSO_3CH_3{}^-$$
$$\phantom{xxxx}\underset{CH_3}{|}\phantom{xxxxxxxxxxxx}\underset{C_4H_9(n)}{|}$$

and possesses excellent sublimation fastness compared to the non-quaternary compounds of Examples 2 and 4 which exhibit appreciable sublimation.

EXAMPLE 4

A solution of 23.4 grams of 4-N-ethyl-N-β-dimethylaminoethylamino)-2-methylbenzaldehyde, 6.6 grams of malononitrile and 1 cc. of piperidine in 100 cc. of alcohol was refluxed for 1 hour. The reaction mixture resulting was cooled to 10° C. Yellow crystals of the desired product precipitated and were recovered by filtration, washed with cold methyl alcohol and air-dried. The methine compound thus obtained dyes Orlon and Verel textile materials fast, bright yellow shades.

EXAMPLE 5

Quaternization 1 gram of the product of Example 4 was heated on the steam bath for 2 hours with 5 cc. of dimethyl sulfate. After cooling, the reaction mixture was diluted with 5 volumes of ether and the product which precipitated was recovered by filtration, washed with ether and dried. A quaternary ammonium salt form of the methine compound of Example 4 was obtained. It is water-soluble and dyes Verel and Orlon textile materials fast greenish-yellow shades.

EXAMPLE 6

Thirty grams of 4-(N-ethyl-N-γ-morpholinopropylamino)-2-methylbenzaldehyde, 9.9 grams of methyl cyanoacetate, 1 cc. of piperidine and 100 cc. of alcohol were refluxed together for 1 hour. The reaction mixture was then diluted with hot water to incipient crystallization and cooled to room temperature while stirring. The product which precipitated was recovered by filtration, washed with water and air-dried. The product quaternized with dimethylsulfate as in Example 3, dyes acrylic and modacrylic fibers fast yellow shades.

EXAMPLE 7

The process of Example 1 was carried out using 28.2 g. of 4 - N - ethyl-N-(N,N'-di-β-cyanoethylamino)ethyl-m-toluidine. 15.6 g. (0.05 m.) of the product were treated with 3.3 g. of malononitrile and 5 drops of piperidine in 50 cc. of alcohol as in Example 2.

EXAMPLE 8

5 g. of the product of Example 7, 5 g. of methyl iodide and 50 cc. of ether were mixed and allowed to stand at room temperature for 72 hours. The solid was filtered off, washed and dried. It dissolves in warm water and imparts fast greenish-yellow shades to Orlon and Verel textiles.

EXAMPLE 9

The process of Example 2 was used with 25.8 g. of 4-(N-ethyl-N-β-diethylaminoethyl)-2-methylbenzaldehyde.

EXAMPLE 10

1 g. of the dye of Example 9, 1 g. of ethyl p-toluenesulfonate and 7 cc. of dry benzene were stirred at 40–50° C. for 2 hours. The yellow solid was filtered off, washed with ether and air-dried. The product dyes acrylic fibers in bright greenish-yellow shades.

EXAMPLE 11

Aldehyde preparation 200 ml. of phosphorous oxy chloride was added over a four hour period of a solution of 179 g. of N,β-hydroxyethyl-N-ethyl-m-toluidine in 90 ml. of dimethylformamide at a temperature of 25–90° C. After heating the reaction mixture on the steam bath for two hours it was drowned in 6 l. of water and ice. The resulting solid was filtered off and washed with 8 l. of water. The yield of p-(N,β-chloroethyl-N-ethylamino)-o-tolyl aldehyde was 179 g. It had a melting point of 46 to 47° C.

EXAMPLE 12

4.5 g. of the aldehyde of Example 11 was dissolved in 20 ml. of pyridine. The reaction solution was heated at reflux for 45 hrs., cooled slightly, 1.32 g. malononitrile and 2 drops of piperidine added and then reflux continued for 1 hr. The excess pyridine was removed by distillation in vacuo and the residue dissolved in 200 ml. of water, filtered from any insoluble material and the dye precipitated by addition of an aqueous solution of NaCl and ZnCl$_2$. There is obtained the zinc chloride salt of the methine compound:

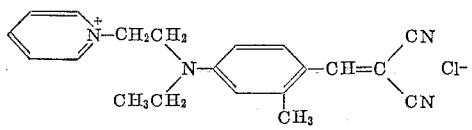

The product dyes Orlon acrylic fibers and Verel modacrylic fibers fast yellow shades.

EXAMPLE 13

The use of cyanoacetamide for malononitrile in the process of Example 12 yields a quaternary dye in which the =C(CN)$_2$ group of the Example 12 dye is replaced by =C(CN)CONH$_2$. The product dyes Orlon acrylic fibers and Verel modacrylic fibers fast yellow shades.

EXAMPLE 14

The use of methylcyanoacetate for malononitrile in the process of Example 12 yields a dye in which the =C(CN)$_2$ group of the Example 12 dye is replaced by =C(CN)COOCH$_3$. Tne product dyes Orlon acrylic fibers and Verel modacrylic fibers fast yellow shades.

EXAMPLE 15

The process of Example 12 is carried out using p-(N, β-chloroethyl-N-butylamino)benzaldehyde in place of p-(N,β - chloroethylamino) - o - tolyl aldehyde. A yellow methine dye is obtained in which the CH$_3$CH$_2$— group of the Example 12 dye is replaced by CH$_3$(CH$_2$)$_3$—. The product dyes Orlon acrylic fibers and Verel modacrylic fibers fast yellow shades.

EXAMPLE 16

4.5 g. of p-(N,β-chloroethyl-N-ethylamino)-o-tolyl aldehyde was dissolved in 25 ml. of quinoline. The reaction solution was heated at 115° C. for 24 hr., cooled slightly and 1.32 g. of malononitrile and 2 drops of piperidine were added. After heating for ½ hr. on the steam bath, the reaction mixture was drowned in dilute hydrochloric acid. It was filtered from any water insoluble material and the yellow dye precipitated by addition of NaI. The resulting dye has the structure of Example 12 except that the N-pyridinium group is replaced by the N-quinolinium group. The product dyes Orlon acrylic fibers and Verel modacrylic fibers fast yellow shades.

EXAMPLE 17

The use of β-picoline in the process of Example 16 gives a dye of structure as in Example 12 except that the N-pyridinium group is replaced by the N-β-picolinium group. The product dyes Orlon acrylic fibers and Verel modacrylic fibers fast yellow shades.

EXAMPLE 17A 4.5 g. of the aldehyde of Example 11 and 1.32 g. of malononitrile were heated at reflux in 20 cc. of ethanol containing 2 drops of piperidine. After one hour the mix was cooled and the product isolated by filtration. The dried solid was dissolved in 20 cc. of 2-picoline and heated at 115–120° C. for 45 hours. The excess solvent was removed by distillation in vacuo and residue dissolved in 200 cc. of water. After filtration NaCl and ZnCl$_2$ were added, precipitating the ZnCl$_2$ salt of the dye.

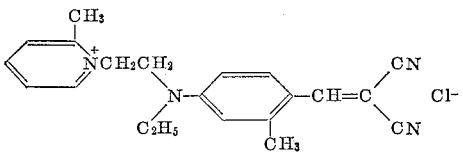

The dyes described in the following table are prepared in the manner of the above examples and dye acrylic and modacrylic fibers in fast yellow shades

| Example | $R_1R_2R_3N^+$ | R | X | $R_4$ | Y | Z |
|---|---|---|---|---|---|---|
| 18 | Pyridinium | $C_2H_5$ | CN | -C$_6$H$_3$(CH$_3$)- | $C_2H_4$ | Cl |
| 19 | do | $C_2H_5$ | CN | -C$_6$H$_4$- | $C_2H_4$ | Cl |
| 20 | β-Picolinium | $C_2H_5$ | CN | -C$_6$H$_3$(CH$_3$)- | $C_2H_4$ | I |
| 21 | Quinolinium | $C_2H_5$ | $COCH_3$ | -C$_6$H$_3$(CH$_3$)- | $C_2H_4$ | Cl |
| 22 | β-Picolinium | $C_2H_5$ | $CO_2CH_3$ | -C$_6$H$_3$(CH$_3$)- | $C_2H_4$ | I |
| 23 | Pyridinium | $C_2H_5$ | $CO_2CH(CH_3)_2$ | -C$_6$H$_3$(CH$_3$)- | $C_2H_4$ | Cl |
| 24 | do | $C_2H_5$ | $CO_2CH_2CH_2OCH_3$ | -C$_6$H$_3$(CH$_3$)- | $C_2H_4$ | Cl |
| 25 | do | $C_2H_5$ | $CO_2CH_2CH(CH_3)_2$ | -C$_6$H$_3$(CH$_3$)- | $C_2H_4$ | Cl |
| 26 | do | $C_2H_5$ | $CO_2CH_2CH_2CN$ | -C$_6$H$_3$(CH$_3$)- | $C_2H_4$ | Cl |

Other substituted anilines containing the radical

and which may be used to prepare the quaternary methine compounds are disclosed in Example 14 of our parent application e.g. N - isopropyl - N - piperidinoethyl - m-toluidine, which are converted to the aldehydes which are then quaternized and the methine compounds prepared therefrom as described.

The dyeing of acrylic fibers with the dyes such as described in Example 3 can be carried out as follows:

16.7 mg. of the dye of Example 3 was added to 200 cc. of hot water. Five cc. of 10% formic acid was added followed by 5 g. of Orlon 42 acrylic fabric. The bath was brought to the boil and held one hour. The dried fabric is a bright greenish yellow of excellent fastness properties.

The invention has been described in considerable detail with particular reference to certain preferred embodiments thereof, but it will be understood that variations and modifications can be effected within the spirit and scope of the invention as described hereinabove and as defined in the appended claims.

What we claim is:
1. A quaternary methine compound having the formula

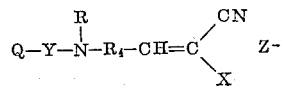

wherein:
Q=an N-pyridinium radical or an N-quinolinium radical,
R=lower alkyl,
$R_4$=a p-phenylene radical,
X=a member of the class consisting of cyano,

—COOCH$_2$CH$_2$CN lower —COO alkyl, lower —CON(alkyl)$_2$ and —CONH$_2$,
Y=lower alkylene,
Z=an acid anion.

2. A quaternary methine compound having the formula

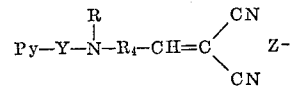

wherein:
Py=an N-pyridinium radical,
Y=lower alkylene,
R=lower alkyl,
$R_4$=a p-phenylene radical,
Z=an acid anion.

3. A quaternary methine compound having the formula

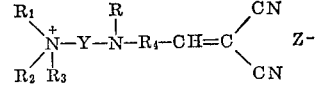

wherein:
R=a lower alkyl radical,
$R_1, R_2, R_3$ each=lower alkyl,
$R_4$=p-phenylene,
Y=lower alkylene,
Z=an acid anion.

4. A quaternary methine compound having the formula $$Py-Y-\overset{R}{\underset{|}{N}}-R_4-CH=C\overset{CN}{\underset{CONH_2}{\diagdown}} \quad Z^-$$

wherein:
Py=an N-pyridinium radical,
R=lower alkyl,
Y=lower alkylene,
Z=an acid anion.

5. A quaternary methine compound having the formula $$Py-Y-\overset{R}{\underset{|}{N}}-R_4-CH=C\overset{CN}{\underset{COOCH_3}{\diagdown}} \quad Z^-$$

wherein:
Py=an N-pyridinium radical,
R=lower alkyl,
Y=lower alkylene,
Z=an acid anion.

6. A quaternary methine compound having the formula $$(C_2H_5)_2\overset{+}{N}-CH_2CH_2-\underset{\overset{|}{CH_3}}{\overset{\overset{C_4H_{9(n)}}{|}}{N}}-\underset{}{\langle\ \rangle}-CH=C\overset{CN}{\underset{CN}{\diagdown}} \quad Z^-$$

wherein $Z^-$ represents an acid anion.

7. A quaternary methine compound having the formula $$(C_2H_5)_2\overset{+}{N}-CH_2CH_2-\underset{\overset{|}{CH_3}}{\overset{\overset{C_2H_5}{|}}{N}}-\underset{}{\langle\ \rangle}-CH=C\overset{CN}{\underset{CN}{\diagdown}} \quad Z^-$$

wherein $Z^-$ represents an acid anion.

8. A quaternary methine compound having the formula $$\underset{}{\langle\overset{+}{N}\rangle}-CH_2CH_2-\underset{\overset{|}{CH_3CH_2}}{\overset{\overset{}{|}}{N}}-\underset{\overset{|}{CH_3}}{\langle\ \rangle}-CH=C\overset{CN}{\underset{CN}{\diagdown}} \quad Z^-$$

wherein $Z^-$ represents an acid anion.

9. A quaternary methine compound having the formula $$\underset{}{\langle\overset{+}{N}\rangle}-CH_2CH_2-\underset{\overset{|}{CH_3CH_2CH_2CH_2}}{\overset{\overset{}{|}}{N}}-\underset{}{\langle\ \rangle}-CH=C\overset{CN}{\underset{CN}{\diagdown}} \quad Z^-$$

wherein $Z^-$ represents an acid anion.

10. A quaternary methine compound having the formula $$\underset{}{\langle\overset{+}{N}\rangle\overset{CH_3}{}}-CH_2CH_2-\underset{\overset{|}{CH_3CH_2}}{\overset{\overset{}{|}}{N}}-\underset{\overset{|}{CH_3}}{\langle\ \rangle}-CH=C\overset{CN}{\underset{CN}{\diagdown}} \quad Z$$

wherein $Z^-$ represents an acid anion.

11. A compound having the formula of claim 6 wherein Z represents the ion $OSO_2CH_3^-$.
12. A compound having the formula of claim 7 wherein Z represents the ion $OSO_2CH_3^-$.
13. A compound having the formula of claim 8 wherein Z represents the chloride ion.
14. A compound having the formula of claim 9 wherein Z represents the chloride ion.
15. A compound having the formula of claim 10 wherein Z represents the iodide ion.

References Cited by the Examiner

UNITED STATES PATENTS

| | | | |
|---|---|---|---|
| 2,914,551 | 11/1959 | Kartinos et al. | 260—465 |
| 3,141,018 | 7/1964 | Straley et al. | 260—247.2 |

FOREIGN PATENTS

| | | |
|---|---|---|
| 1,103,485 | 3/1961 | Germany. |
| 615,414 | 1/1959 | Italy. |

OTHER REFERENCES 582,316, Belgium abstracted in Derwent Belgium Patents Reports, vol. 61A, page A4 (January 31, 1960).

JOHN D. RANDOLPH, *Acting Primary Examiner.*
WALTER A. MODANCE, *Examiner.*